(12) United States Patent
Ohta et al.

(10) Patent No.: US 12,052,675 B2
(45) Date of Patent: Jul. 30, 2024

(54) BASE STATION, MOBILE STATION, COMMUNICATION SYSTEM, AND COMMUNICATION METHOD

(71) Applicant: FUJITSU LIMITED, Kawasaki (JP)

(72) Inventors: Yoshiaki Ohta, Yokohama (JP); Masatsugu Shimizu, Yokohama (JP); Yoshihiro Kawasaki, Kawasaki (JP); Takayoshi Ode, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 18/236,446

(22) Filed: Aug. 22, 2023

(65) Prior Publication Data

US 2023/0397134 A1 Dec. 7, 2023

Related U.S. Application Data

(63) Continuation of application No. 17/160,615, filed on Jan. 28, 2021, now Pat. No. 11,778,571, which is a
(Continued)

(51) Int. Cl.
*H04W 24/10* (2009.01)
*H04W 16/14* (2009.01)
(Continued)

(52) U.S. Cl.
CPC ......... *H04W 56/001* (2013.01); *H04W 16/14* (2013.01); *H04W 24/10* (2013.01); *H04W 68/005* (2013.01); *H04W 72/30* (2023.01)

(58) Field of Classification Search
CPC ... H04W 56/001; H04W 16/14; H04W 24/10; H04W 68/005; H04W 72/30;
(Continued)

(56) References Cited

U.S. PATENT DOCUMENTS

2014/0314024 A1  10/2014  Ohta et al.
2017/0338923 A1  11/2017  Prasad et al.
(Continued)

FOREIGN PATENT DOCUMENTS

JP    2009-284252 A    12/2009
JP    2017-212733 A    11/2017
(Continued)

OTHER PUBLICATIONS

3GPP TR 38.912 V14.1.0, "3rd Generation Partnership Project; Technical Specification Group Radio Access Network; Study on New Radio (NR) access technology (Release 14)", Jun. 2017.
(Continued)

*Primary Examiner* — Chuong A Ngo
(74) *Attorney, Agent, or Firm* — Myers Wolin, LLC

(57) ABSTRACT

A base station that can transmit a synchronization signal at a predetermined transmission interval in a plurality of cycles includes a processor configured to continuously transmit the synchronization signal in a plurality of radio signals; and control radio measurement of a mobile station connected to the base station such that the mobile station detects the synchronization signal under a condition in accordance with second information that has been scaled by using first information.

11 Claims, 10 Drawing Sheets

Related U.S. Application Data continuation of application No. PCT/JP2018/028759, filed on Jul. 31, 2018.

(51) Int. Cl.
*H04W 56/00* (2009.01)
*H04W 68/00* (2009.01)
*H04W 72/30* (2023.01)

(58) Field of Classification Search
CPC ......... H04W 52/0229; H04W 52/0274; H04W 56/0015; H04W 48/16; H04W 16/28; H04W 88/08; Y02D 30/70
See application file for complete search history.

(56) References Cited

U.S. PATENT DOCUMENTS

| | | | |
|---|---|---|---|
| 2018/0049269 A1* | 2/2018 | Fujishiro | H04W 52/0216 |
| 2018/0176710 A1 | 6/2018 | Jang et al. | |
| 2019/0045416 A1 | 2/2019 | Hwang et al. | |
| 2019/0320471 A1* | 10/2019 | Ohara | H04W 52/50 |
| 2019/0373570 A1 | 12/2019 | Yokomakura et al. | |
| 2021/0044997 A1* | 2/2021 | Hong | H04W 36/08 |

FOREIGN PATENT DOCUMENTS

| | | |
|---|---|---|
| WO | 2013/105260 A1 | 7/2013 |
| WO | 2017/123009 A1 | 7/2017 |
| WO | 2017/167918 A1 | 10/2017 |
| WO | 2018/123468 A1 | 7/2018 |

OTHER PUBLICATIONS

3GPP TR 38.913 V14.3.0, "3rd Generation Partnership Project; Technical Specification Group Radio Access Network; Study on Scenarios and Requirements for Next Generation Access Technologies; (Release 14)", Jun. 2017.
3GPP TS 36.133 V15.1.0, 3rd Generation Partnership Project; Technical Specification Group Radio Access Network; Evolved Universal Terrestrial Radio Access (E-UTRA); Requirements for support of radio resource management (Release 15), Dec. 2017.
3GPP TS 36.211 V15.1.0, "3rd Generation Partnership Project; Technical Specification Group Radio Access Network; Evolved Universal Terrestrial Radio Access (E-UTRA); Physical channels and modulation (Release 15)", Mar. 2018.
3GPP TS 36.212 V15.1.0, "3rd Generation Partnership Project; Technical Specification Group Radio Access Network; Evolved Universal Terrestrial Radio Access (E-UTRA); Multiplexing and channel coding (Release 15)", Mar. 2018.
3GPP TS 36.213 V15.1.0, "3rd Generation Partnership Project; Technical Specification Group Radio Access Network; Evolved Universal Terrestrial Radio Access (E-UTRA); Physical layer procedures (Release 15)", Mar. 2018.
3GPP TS 36.214 V15.1.0, "3rd Generation Partnership Project; Technical Specification Group Radio Access Network; Evolved Universal Terrestrial Radio Access (E-UTRA);Physical layer; Measurements(Release 15)", Mar. 2018.
3GPP TS 36.300 V15.1.0, "3rd Generation Partnership Project; Technical Specification Group Radio Access Network; Evolved Universal Terrestrial Radio Access (E-UTRA) and Evolved Universal Terrestrial Radio Access Network (E-UTAN); Overall description; Stage 2 (Release 15)", Mar. 2018.
3GPP TS 36.321 V15.1.0, "3rd Generation Partnership Project; Technical Specification Group Radio Access Network; Evolved Universal Terrestrial Radio Access (E-UTRA); Medium Access Control (MAC) protocol specification (Release 15)", Mar. 2018.
3GPP TS 36.322 V15.0.1, "3rd Generation Partnership Project; Technical Specification Group Radio Access Network; Evolved Universal Terrestrial Radio Access (E-UTRA); Radio Link Control (RLC) protocol specification (Release 15)", Apr. 2018.
3GPP TS 36.323 V14.5.0, "3rd Generation Partnership Project; Technical Specification Group Radio Access Network; Evolved Universal Terrestrial Radio Access (E-UTRA); Packet Data Convergence Protocol (PDCP) specification (Release 14)", Dec. 2017.
3GPP TS 36.331 V15.1.0, "3rd Generation Partnership Project; Technical Specification Group Radio Access Network; Evolved Universal Terrestrial Radio Access (E-UTRA); Radio Resource Control (RRC); Protocol specification (Release 15)", Mar. 2018.
3GPP TS 36.413 V15.1.0, "3rd Generation Partnership Project; Technical Specification Group Radio Access Network; Evolved Universal Terrestrial Radio Access Network (E-UTRAN); S1 Application Protocol (S1AP) (Release 15)", Mar. 2018.
3GPP TS 36.423 V15.1.0, "3rd Generation Partnership Project; Technical Specification Group Radio Access Network; Evolved Universal Terrestrial Radio Access Network (E-UTRAN); X2 application protocol (X2AP) (Release 15)". Mar. 2018.
3GPP TS 36.425 V15.0.0, "3rd Generation Partnership Project; Technical Specification Group Radio Access Network; Evolved Universal Terrestrial Radio Access Network (E-UTRAN); X2 interface user plane protocol (Release 15)", Jun. 2018.
3GPP TR 36.912 V14.0.0, "3rd Generation Partnership Project; Technical Specification Group Radio Access Network; Feasibility study for Further Advancements for E-UTRA (LTE-Advanced) (Release 14)", Mar. 2017.
3GPP TS 37.340 V15.1.0, "3rd Generation Partnership Project; Technical Specification Group Radio Access Network; Evolved Universal Terrestrial Radio Access (E-UTRA) and NR; Multi-connectivity; Stage 2 (Release 15)", Mar. 2018.
3GPP TR 38.900 V14.3.1, "3rd Generation Partnership Project; Technical Specification Group Radio Access Network; Study on channel model for frequency spectrum above 6 GHz (Release 14)", Jul. 2017.
3GPP TS 38.201 V15.0.0, "3rd Generation Partnership Project; Technical Specification Group Radio Access Network; NR; Physical layer; General description (Release 15)", Dec. 2017.
3GPP TS 38.202 V15.1.0, "3rd Generation Partnership Project; Technical Specification Group Radio Access Network; NR; Services provided by the physical layer (Release 15)", Mar. 2018.
3GPP TS 38.211 V15.1.0, "3rd Generation Partnership Project; Technical Specification Group Radio Access Network; NR; Physical channels and modulation (Release 15)", Mar. 2018.
3GPP TS 38.212 V15.1.0, "3rd Generation Partnership Project; Technical Specification Group Radio Access Network; NR; Multiplexing and channel coding (Release 15)", Mar. 2018.
3GPP TS 38.213 V15.1.0, "3rd Generation Partnership Project; Technical Specification Group Radio Access Network; NR; Physical layer procedures for control (Release 15)", Mar. 2018.
3GPP TS 38.214 V15.1.0, "3rd Generation Partnership Project; Technical Specification Group Radio Access Network; NR; Physical layer procedures for data (Release 15)", Mar. 2018.
3GPP TS 38.215 V15.1.0, "3rd Generation Partnership Project; Technical Specification Group Radio Access Network; NR; Physical layer measurements (Release 15)", Mar. 2018.
3GPP TS 38.300 V15.1.0, "3rd Generation Partnership Project; Technical Specification Group Radio Access Network; NR; NR and NG-RAN Overall Description; Stage 2 (Release 15)", Mar. 2018.
3GPP TS 38.321 V15.1.0, "3rd Generation Partnership Project; Technical Specification Group Radio Access Network; NR; Medium Access Control (MAC) protocol specification (Release 15)", Mar. 2018.
3GPP TS 38.322 V15.1.0, "3rd Generation Partnership Project; Technical Specification Group Radio Access Network; NR; Radio Link Control (RLC) protocol specification (Release 15)", Mar. 2018.
3GPP TS 38.323 V15.1.0, "3rd Generation Partnership Project; Technical Specification Group Radio Access Network; NR; Packet Data Convergence Protocol (PDCP) specification (Release 15)", Mar. 2018.
3GPP TS 38.331 V15.1.0, "3rd Generation Partnership Project; Technical Specification Group Radio Access Network; NR; Radio Resource Control (RRC) protocol specification (Release 15)", Mar. 2018.

(56) References Cited

OTHER PUBLICATIONS

3GPP TS 38.401 V15.1.0, "3rd Generation Partnership Project; Technical Specification Group Radio Access Network; NG-RAN; Architecture description (Release 15)", Mar. 2018.
3GPP TS 38.410 V0.9.0, "3rd Generation Partnership Project; Technical Specification Group Radio Access Network; NG-RAN; NG general aspect and principles (Release 15)", Apr. 2018.
3GPP TS 38.413 V0.8.0, "3rd Generation Partnership Project; Technical Specification Group Radio Access Network; NG-RAN; NG Application Protocol (NGAP) (Release 15)", Apr. 2018.
3GPP TS 38.420 V0.8.0, "3rd Generation Partnership Project; Technical Specification Group Radio Access Network; NG-RAN; Xn general aspects and principles (Release 15)", Apr. 2018.
3GPP TS 38.423 V0.8.0, "3rd Generation Partnership Project; Technical Specification Group Radio Access Network; NG-RAN; Xn application protocol (XnAP) (Release 15)", Apr. 2018.
3GPP TS 38.470 V15.1.0, "3rd Generation Partnership Project; Technical Specification Group Radio Access Network; NG-RAN; F1 general aspects and principles (Release 15)", Mar. 2018.
3GPP TS 38.473 V15.1.0, "3rd Generation Partnership Project; Technical Specification Group Radio Access Network; NG-RAN; F1 application protocol (F1AP) (Release 15)", Mar. 2018.
3GPP TR 38.801 V14.0.0, "3rd Generation Partnership Project; Technical Specification Group Radio Access Network; Study on new radio access technology: Radio access architecture and interfaces (Release 14)", Mar. 2017.
3GPP TR 38.802 V14.2.0, "3rd Generation Partnership Project; Technical Specification Group Radio Access Network; Study on New Radio Access Technology Physical Layer Aspects (Release 14)", Sep. 2017.
3GPP TR 38.803 V14.2.0, "3rd Generation Partnership Project; Technical Specification Group Radio Access Network; Study on new radio access technology: Radio Frequency (RF) and co-existence aspects (Release 14)", Sep. 2017.
3GPP TR 38.804 V14.0.0, "3rd Generation Partnership Project; Technical Specification Group Radio Access Network; Study on New Radio Access Technology; Radio Interface Protocol Aspects (Release 14)", Mar. 2017.
International Search Report issued by the Japan Patent Office for corresponding International Patent Application No. PCT/JP2018/028759, mailed on Sep. 4, 2018, with an English translation.
Written Opinion of the International Searching Authority issued by the Japan Patent Office for corresponding International Patent Application No. PCT/JP2018/028759, mailed on Sep. 4, 2018, with an English translation.
Samsung, "Mobility states and speed dependent scaling of measurement related parameters in NR Idle/ Inactive mode", Agenda Item: 10.4.2.2, 3GPP TSG-RAN WG2 2017 RAN2#98 Meeting, R2-1705828, Hangzhou, China, May 15-19, 2017.
CMCC, "Discussion on NR-SS periodicity", Agenda Item: 10.6.8, 3GPP TSG-RAN WG4 Meeting #83, R4-1705243, Hangzhou, China, May 15-19, 2017.
Ericsson, "UE speed-based measurement report parameter scaling in NR", Agenda Item: 10.4.1.4.8, 3GPP TSG-RAN WG2 Meeting #98-AdHoc, R2-1707288, Qingdao, China, Jun. 27-29, 2017.
Huawei et al., "Speed dependent mobility in NR", Agenda Item: 10.4.1.3, 3GPP TSG-RAN WG2 Meeting #97bis, R2-1703388, Spokane, USA, Apr. 3-7, 2017.
Extended European search report with the supplementary European search report and the European search opinion issued by the European Patent Office for corresponding European Patent Application No. 18928754.3-1212, dated Jul. 8, 2021.
Notice of Preliminary Rejection issued by the Korean Intellectual Property Office for corresponding Korean Patent Application No. 10-2021-7002920, mailed on Mar. 30, 2022.
Examination Report issued by the Patent Office of India for corresponding Indian Patent Application No. 202137003624, dated Sep. 13, 2022, with an English translation.
Notice of Final Rejection issued by the Korean Intellectual Property Office for corresponding Korean Patent Application No. 10-2021-7002920, mailed on Nov. 28, 2022, with an English translation.
Communication pursuant to Article 94(3) EPC issued by the European Patent Office for corresponding European Patent Application No. 18 928 754.3-1216, dated May 3, 2023.
First Notification of Office Action and Search Report issued by the China National Intellectual Property Administration for Chinese Patent Application No. 201880096138.2, dated May 16, 2023, with an English translation.
Non-Final Office Action issued by the United States Patent and Trademark Office for corresponding U.S. Appl. No. 17/160,615, electronically delivered on Feb. 1, 2023.
Notice of Allowance issued by the United States Patent and Trademark Office for corresponding U.S. Appl. No. 17/160,615, electronically delivered on May 23, 2023.
Notice of Reasons for Refusal issued by the Japan Patent Office for corresponding Japanese Patent Application No. 2022-143146, mailed on Mar. 26, 2024, with an English translation.

\* cited by examiner

| MOVING SPEED | FIRST INFORMATION (PARAMETER: Ps) |
|---|---|
| V2 TO | Ps3 |
| V1 TO V2 | Ps2 (>Ps3) |
| 0 TO V1 | Ps1 (>Ps2) |

51

| FIRST INFORMATION (PARAMETER: Ps) | SECOND INFORMATION | |
| | FIRST MEASUREMENT CYCLE (Tm1) | SECOND MEASUREMENT CYCLE (Tm2) |
|---|---|---|
| Ps3 | Td×Ps3 | Td×N×Ps3 |
| Ps2 (>Ps3) | Td×Ps2 | Td×N×Ps2 |
| Ps1 (>Ps2) | Td×Ps1 | Td×N×Ps1 |

151

FIG.9 (a)
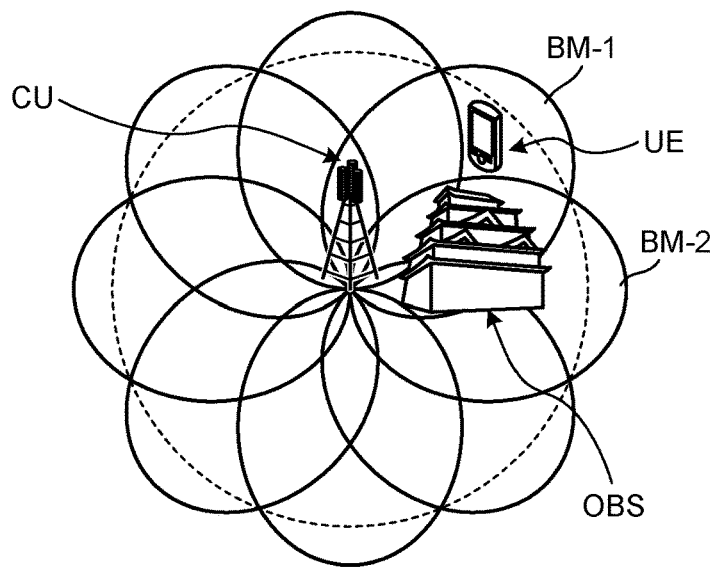
(b)
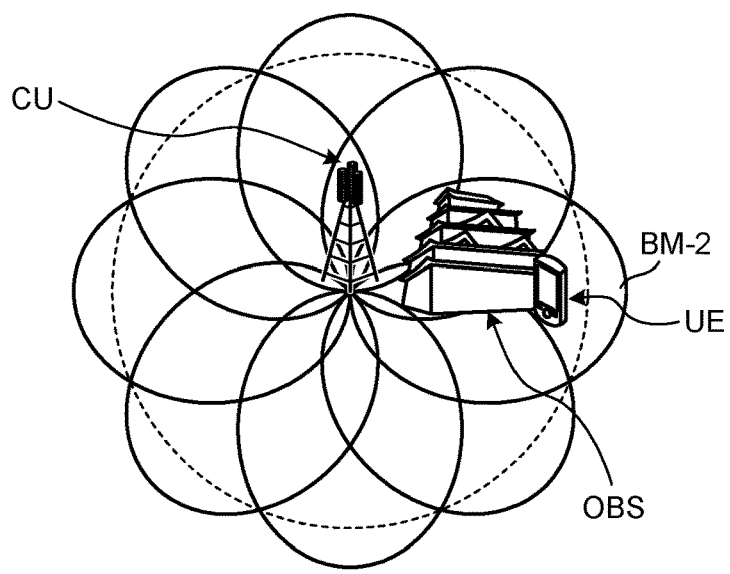
(c)
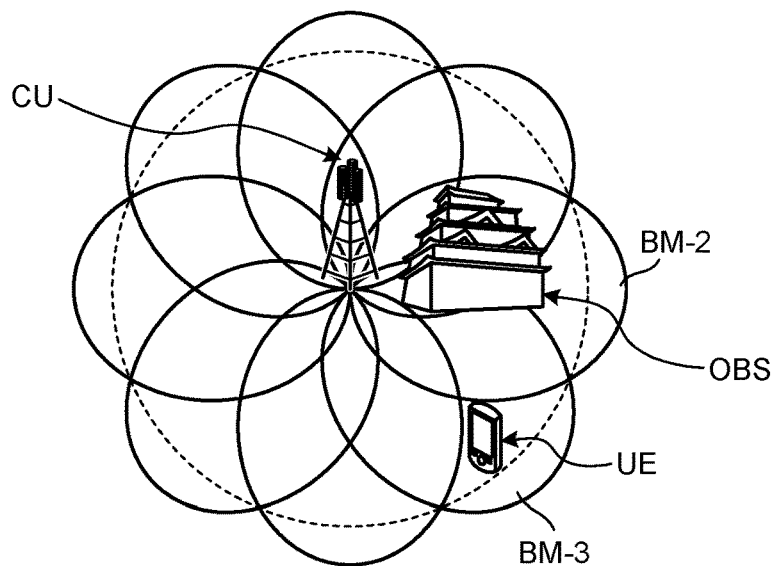

BASE STATION, MOBILE STATION, COMMUNICATION SYSTEM, AND COMMUNICATION METHOD

CROSS-REFERENCE TO RELATED APPLICATION

This application is a continuation application U.S. application Ser. No. 17/160,615 filed on Jan. 28, 2021, which is a continuation of International Application PCT/JP2018/028759, filed on Jul. 31, 2018, and designating the U.S., the entire contents of each are incorporated herein by reference.

FIELD

The present invention relates to a base station, a mobile station, a communication system, and a communication method.

BACKGROUND

In the current networks, traffic of mobile terminals (smartphones and feature phones) occupies most of network resources. Furthermore, traffic used by mobile terminals tends to be continuously increased in the future. In contrast, with the development of Internet of things (IoT) services (for example, monitoring systems of transportation systems, smart meters, devices, and the like), there is a need to cope with services having various request conditions. Thus, in the communication standards for the fifth generation mobile unit communication (5G), in addition to the standard technology of the fourth generation mobile unit communication (4G), there is a demand for a technology that implements high-data-rate, high-capacity, and low-latency communication.

Patent Literature 1: Japanese Laid-open Patent Publication No. 2017-212733
Non Patent Literature 1: 3GPP T536.133 V15.1.0
Non Patent Literature 2: 3GPP T536.300 V15.1.0
Non Patent Literature 3: 3GPP T536.211 V15.1.0
Non Patent Literature 4: 3GPP TS36.212 V15.1.0
Non Patent Literature 5: 3GPP TS36.213 V15.1.0
Non Patent Literature 6: 3GPP TS36.214 V15.1.0
Non Patent Literature 7: 3GPP TS36.321 V15.1.0
Non Patent Literature 8: 3GPP TS36.322 V15.0.1
Non Patent Literature 9: 3GPP TS36.323 V14.5.0
Non Patent Literature 10: 3GPP TS36.331 V15.1.0
Non Patent Literature 11: 3GPP TS36.413 V15.1.0
Non Patent Literature 12: 3GPP TS36.423 V15.1.0
Non Patent Literature 13: 3GPP TS36.425 V15.1.0
Non Patent Literature 14: 3GPP TR36.912 V14.1.0
Non Patent Literature 15: 3GPP TR38.913 V14.3.0
Non Patent Literature 16: 3GPP TR38.801 V14.0.0
Non Patent Literature 17: 3GPP TR38.802 V14.2.0
Non Patent Literature 18: 3GPP TR38.803 V14.2.0
Non Patent Literature 19: 3GPP TR38.804 V14.0.0
Non Patent Literature 20: 3GPP TR38.900 V14.3.1
Non Patent Literature 21: 3GPP TS38.300 V15.1.0
Non Patent Literature 22: 3GPP TS37.340 V15.1.0
Non Patent Literature 23: 3GPP TS38.201 V15.0.0
Non Patent Literature 24: 3GPP TS38.202 V15.1.0
Non Patent Literature 25: 3GPP TS38.211 V15.1.0
Non Patent Literature 26: 3GPP TS38.212 V15.1.0
Non Patent Literature 27: 3GPP TS38.213 V15.1.0
Non Patent Literature 28: 3GPP TS38.214 V15.1.0
Non Patent Literature 29: 3GPP TS38.215 V15.1.0
Non Patent Literature 30: 3GPP TS38.321 V15.1.0
Non Patent Literature 31: 3GPP TS38.322 V15.1.0
Non Patent Literature 32: 3GPP TS38.323 V15.1.0
Non Patent Literature 33: 3GPP TS37.324 V1.5.0
Non Patent Literature 34: 3GPP TS38.331 V15.1.0
Non Patent Literature 35: 3GPP TS38.401 V15.1.0
Non Patent Literature 36: 3GPP TS38.410 V0.9.0
Non Patent Literature 37: 3GPP TS38.413 V0.8.0
Non Patent Literature 38: 3GPP TS38.420 V0.8.0
Non Patent Literature 39: 3GPP TS38.423 V0.8.0
Non Patent Literature 40: 3GPP TS38.470 V15.1.0
Non Patent Literature 41: 3GPP TS38.473 V15.1.0

However, in a communication system conforming to the communication standards for the fifth generation mobile unit communication, there may be a case in which cell selection/reselection is not appropriately performed depending on a way of measuring a mobile station.

SUMMARY

According to an aspect of an embodiment, a base station that can transmit a synchronization signal at a predetermined transmission interval in a plurality of cycles includes: a processor configured to: continuously transmit the synchronization signal in a plurality of radio signals; and control radio measurement of a mobile station connected to the base station such that the mobile station detects the synchronization signal under a condition in accordance with second information that has been scaled by using first information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 9 is a diagram illustrating improvement of a capture rate of an own cell according to the second embodiment.

DESCRIPTION OF EMBODIMENTS

Figure 1:
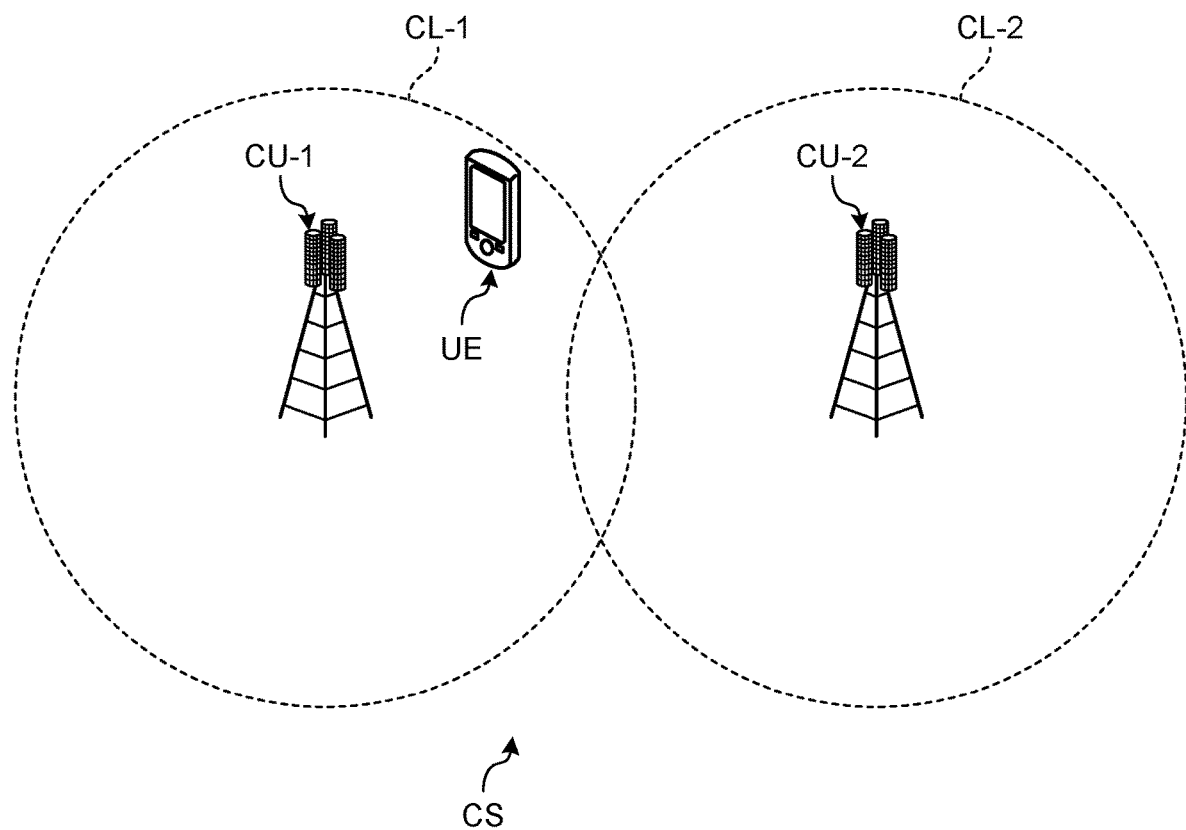
FIG. 1 is a diagram illustrating a configuration of a communication system according to a first embodiment.

Preferred embodiments of a communication system disclosed in the present invention will be described in detail below with reference to the accompanying drawings. Furthermore, the present invention is not limited to the embodiments. Furthermore, in the embodiments, components having the same function are assigned the same reference numerals and descriptions of overlapped portions will be omitted.

First Embodiment

A communication system CS using a radio access network is configured as illustrated in, for example, FIG. 1. FIG. 1 is a diagram illustrating a configuration of the communication system CS. The communication system CS includes a plurality of base stations CU-1 and CU-2 and is provided with a plurality of cells CL-1 and CL-2 corresponding to the plurality of the base stations CU-1 and CU-2, respectively. In a description below, when the plurality of the base stations CU-1 and CU-2 are not distinguished, the base stations CU-1 and CU-2 are simply referred to as a base station CU. When the plurality of the cells CL-1 and CL-2 are not distinguished, the cells CL-1 and CL-2 are simply referred to as a cell CL. Furthermore, the mobile station UE can also be called, for example, a communication device, a terminal, and the like.

Each of the base stations CU can transmit information to a mobile station UE that is present inside the cell CL via a radio link and can receive information from the mobile station UE via the radio link.

For example, each of the base stations CU can transmit system information to the cell CL in a broadcasting manner. The mobile station UE can measure a reference signal (for example, a synchronization signal) included in the system information (radio measurement) and can select and connect, in accordance with the result of the radio measurement, the cell CL suitable for wireless communication between the plurality of the cells CL-1 and CL-2 as an own cell (cell selection). Furthermore, when the cell CL suitable for the wireless communication between the plurality of the cells CL-1 and CL-2 is changed from the own cell to another cell, the mobile station UE can reselect and connect, in accordance with the result of the radio measurement, the other cell (for example, the cell CL-2) (cell reselection).

At this time, each of the base stations CU can perform broadcast transmission to the cell CL by including first information that can control the condition for the radio measurement (for example, cell selection/reselection is appropriately performed) into the system information. Accordingly, the mobile station UE generates second information that is controlled by using the first information and detects a synchronization signal under the condition in accordance with the second information. If the first information is information by which cell selection/reselection can be appropriately performed, the second information that is controlled by using the first information can also have the condition for appropriately performing cell selection/reselection. Consequently, the base station CU can perform control such that the mobile station UE that receives the system information appropriately performs cell selection/reselection. Namely, the mobile station UE can appropriately perform cell selection/reselection.

For example, even when the mobile station UE temporarily enters a blind zone of radio wave (for example, a blind zone of radio wave interception, diffraction, or the like due to buildings), the UE can stay in the own cell in an allowable range (for example, the range determined by a selection condition in accordance with the second condition) instead of immediately starting the measurement of the other cell.

Furthermore, it is possible to propose the content described in the first embodiment to the technical standards and it is possible to realize implementation, and furthermore, for example, it is possible to include an operation of measuring radio quality of mobile stations or an operation of cell selection/reselection into descriptions of the standard specifications.

Second Embodiment

In the first embodiment, a method for optimally reselecting the cell has been described. In a second embodiment, a description will be given of a case in which control is performed such that the mobile station UE appropriately performs cell selection/reselection by the base station CU controlling the cycle of radio measurement of the mobile station UE. Furthermore, the same reference numerals are assigned to the components having the same configuration as those according to the first embodiment.

Figure 2:
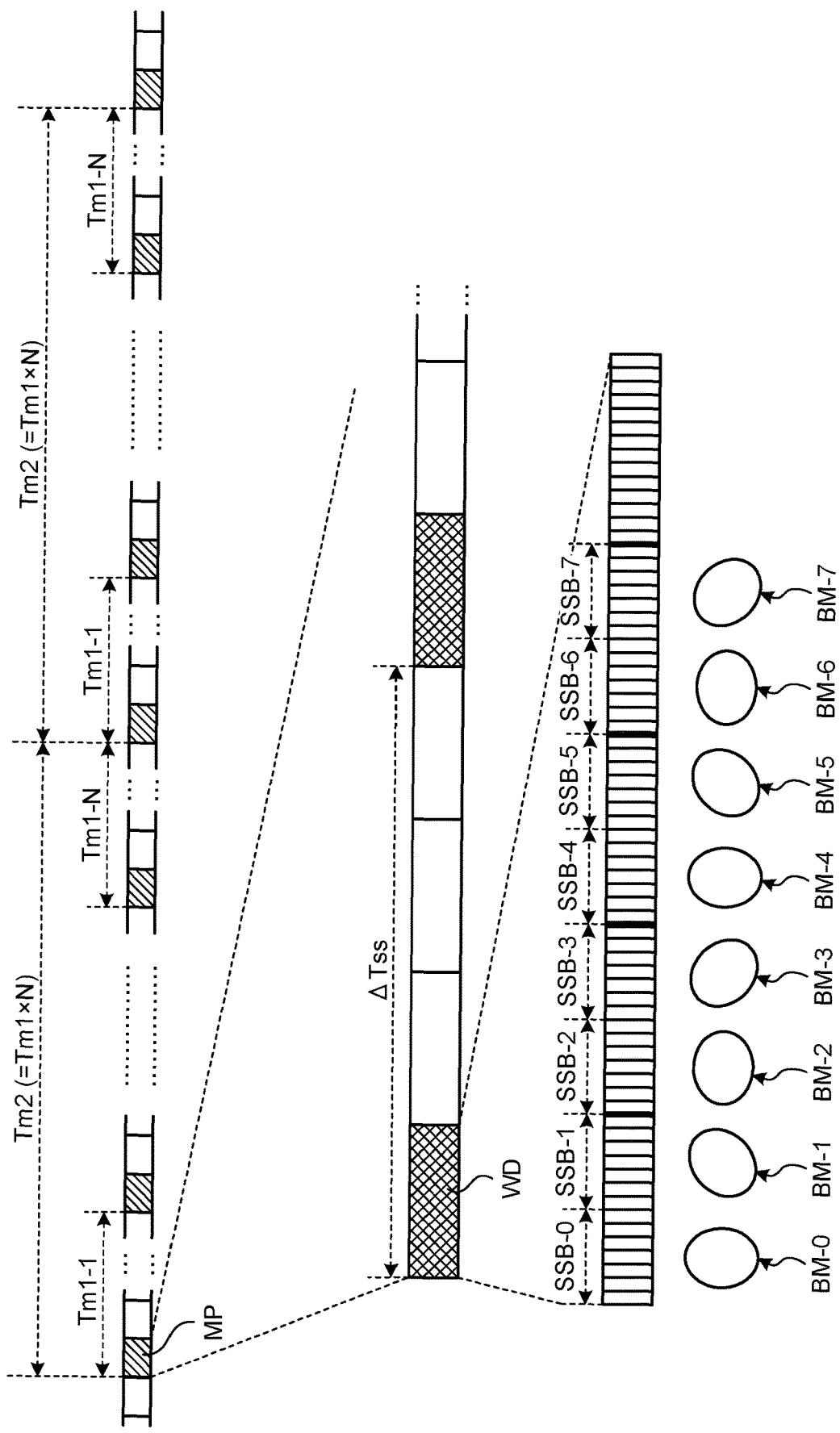
FIG. 2 is a diagram illustrating a relationship between transmission intervals of synchronization signal groups output from a base station and second information (a first measurement cycle and a second measurement cycle) in a mobile station according to a second embodiment.

For example, each of the base stations CU can transmit, as illustrated in FIG. 2, synchronization signals needed for cell selection at predetermined transmission intervals in a plurality of cycles. FIG. 2 is a diagram illustrating a relationship between transmission intervals of synchronization signal groups from the base station CU and the second information (the first measurement cycle and the second measurement cycle) in the mobile station UE according to the second embodiment.

The mobile station UE performs radio measurement that measures, in order to perform cell selection of the own cell, the reception quality of the own cell of the base station CU in a measurement period MP indicated by oblique-line hatching. The mobile station UE repeatedly perform the radio measurement of the own cell every first measurement cycle Tm1. When it is assumed that the first measurement cycle Tm1 is one cycle, the mobile station UE performs cell measurement judgement every N cycle (N is an integer greater than or equal to two), i.e., every second measurement cycle Tm2 (=Tm1×N). The cell measurement judgement judges whether, for example, the mobile station UE meets a criterion of the reception quality of the own cell (for example, a state in which a reception strength of the reference signal is greater than or equal to a threshold) and, when the criterion is met, the mobile station UE selects the own cell, and, when the criterion is not met, the mobile station UE performs radio measurement that measures the reception quality of the base station CU in the other cell. The mobile station UE judges whether the reception quality of the other cell meets the criterion and, when the criterion is met, the mobile station UE reselects the other cell.

In each of the measurement periods MP, a transmission window (transmission interval) WD indicated by cross hatching is repeated n times (n is an integer greater than or equal to two) every transmission cycle ΔTss (for example, 20 ms) (MP=ΔTss×n). In a period of each of the transmission windows WD (for example, 5 ms), synchronization signals are transmitted to the own cell by using beam sweeping. Each of the transmission windows WD includes a plurality of synchronization signal blocks SSB-1 to SSB-8 corresponding to a plurality of beams BM-1 to BM-8, respectively. Each of the synchronization signal blocks SSB is a period of time in which beam forming is performed by the base station CU and the synchronization signals are transmitted by radio beams.

Figure 3:
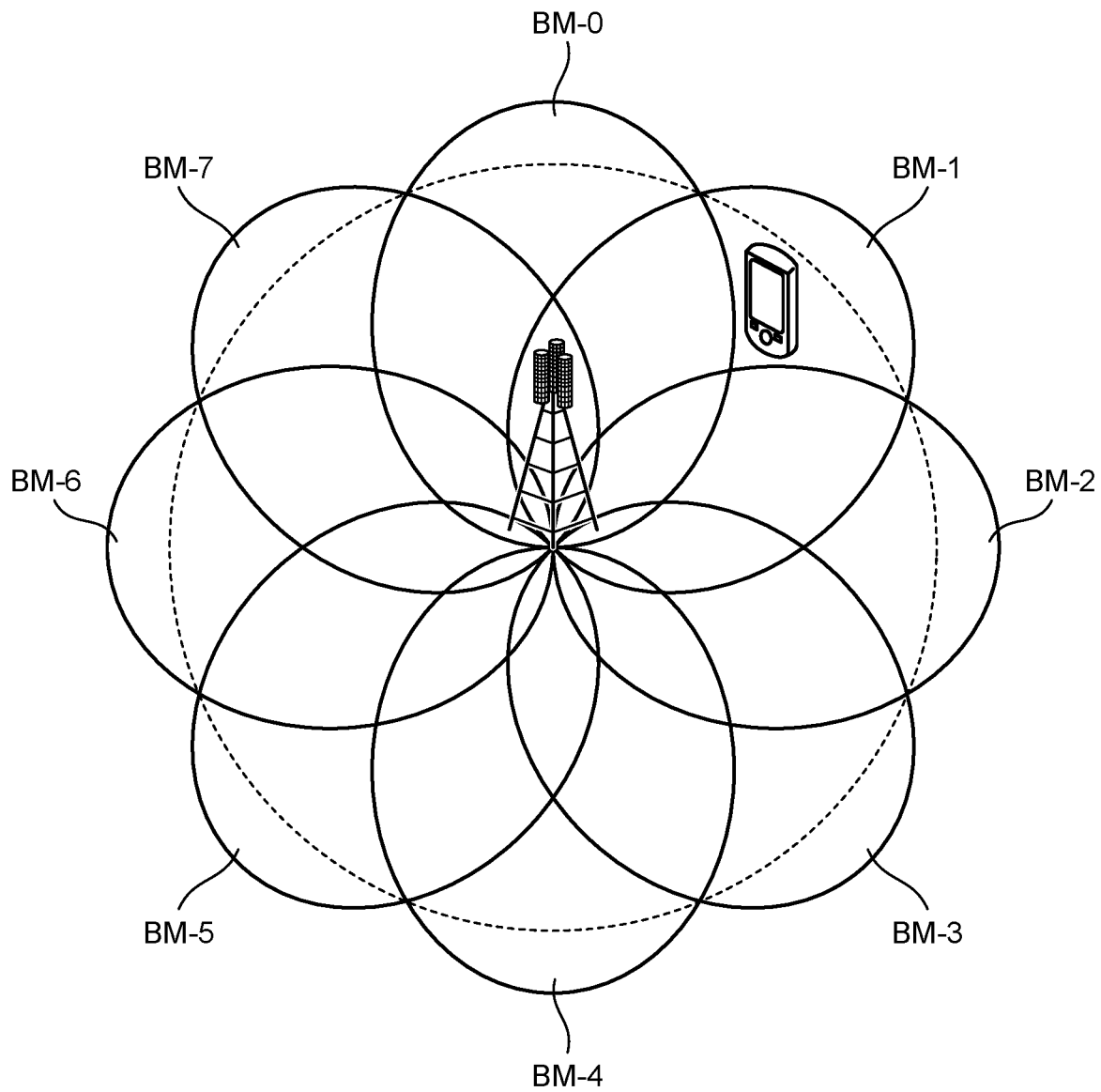
FIG. 3 is a diagram illustrating continuous transmission (beam sweeping) of a plurality of radio signals output from the base station according to the second embodiment.

For example, the base station CU can perform beam sweeping as illustrated in FIG. 3. FIG. 3 is a diagram illustrating continuous transmission (beam sweeping) of a plurality of radio signals output from the base station.

The base station CU can form directional radio beams by beamforming; however, when the base station CU transmits synchronization signals needed for cell selection to the cell CL in a broadcasting manner, the base station CU transmits a large number of beams in order to transmit the beams in all of the available directions. Because it is difficult to simultaneously form a large number of beams, the base station CU performs transmission while sequentially forming the plurality of the beams BM-1 to BM-8 and changing the directions. Consequently, the base station CU can transmit the beams in all of the directions by allowing the plurality of the beams BM-1 to BM-8 to go around inside the cell CL using the transmission windows WD.

Furthermore, FIG. 2 and FIG. 3 illustrates a case, as an example, in which the number of pieces of beam sweeping corresponding to the number of beams used for the beam sweeping is eight; however, the number of pieces of bean sweeping is not limited to eight and can be changed in order to cover all of the available directions.

Here, a description will be given by using a case in which, in the cell CL, an obstacle OBS is present in an area corresponding to the beam BM-2 from among the plurality of the beams BM-1 to BM-8 used for beam sweeping (see FIG. 9). In this case, when the mobile station UE moves at a low speed, in a certain measurement period MP, even when the mobile station UE is present in an area corresponding to the beam BM-1 and it is possible to detect synchronization signals from the base station CU, in the subsequent measurement period MP, the mobile station UE moves to the area corresponding to the beam BM-2 and thus, it may possibly be difficult to detect synchronization signals from the base station CU. This possibility tends to become outstanding when the first measurement cycle Tm1 and the second measurement cycle Tm2 are fixed lengths.

Thus, in the second embodiment, the measurement cycle of the radio measurement in the mobile station is optimized by the base station CU generating broadcast information including the first information and by transmitting the notification information together with the synchronization signals to the mobile station UE such that the mobile station UE performs scaling on the second information related to the measurement cycle of the radio measurement in accordance with the first information.

Figure 4:
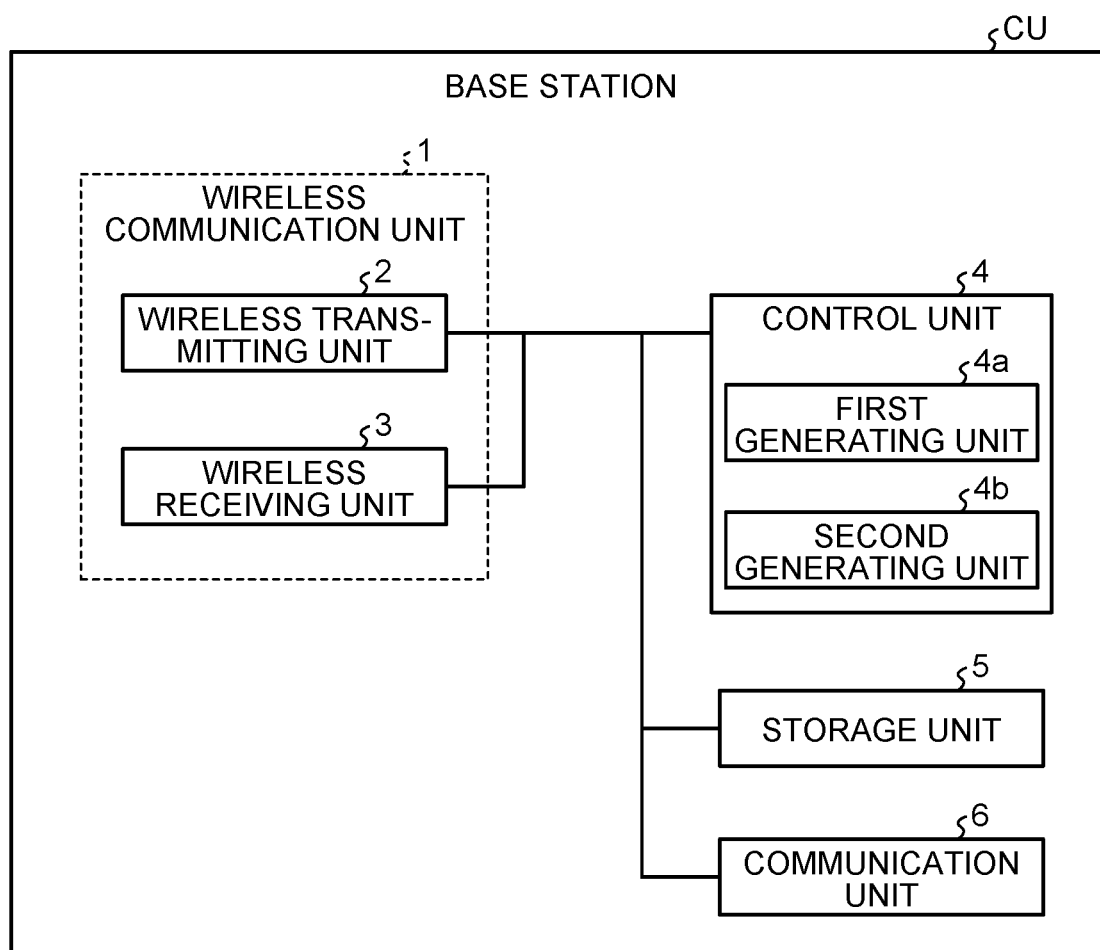
FIG. 4 is a block diagram illustrating a configuration of the base station according to the second embodiment.

Specifically, the base station CU can be configured as illustrated in FIG. 4. FIG. 4 is a diagram illustrating a configuration of the base station CU. The base station CU includes a wireless communication unit 1, a control unit 4, a storage unit 5, and a communication unit 6. The wireless communication unit 1 includes a wireless transmitting unit 2 and a wireless receiving unit 3. The control unit 4 includes a first generating unit 4a and a second generating unit 4b. The communication unit 6 is an interface with respect to a network.

For example, the wireless receiving unit 3 receives measurement information (for example, speed information related to a moving speed, information obtained by measuring radio quality, and the like) measured by the mobile station UE from the mobile station UE and supplies the measurement information to the first generating unit 4a. Furthermore, there may be a case in which the wireless receiving unit 3 does not receive the measurement information in accordance with a state of the mobile station UE. For example, when the state of RRC of the mobile station UE is in a connect mode, the wireless receiving unit 3 receives the measurement information transmitted from the mobile station UE, however, when the state of the RRC of the mobile station UE is in an idle mode and an inactive mode, the wireless receiving unit 3 does not receive the measurement information because these modes are in a state in which transmission from the mobile station UE is not performed.

The first generating unit 4a generates the first information and supplies the first information to the second generating unit 4b. The first generating unit 4a generates the first information by a parameter of a first value in accordance with, for example, the moving speed of the mobile station UE being a first speed. The first generating unit 4a generates the first information by a parameter of a second value in accordance with the moving speed of the mobile station UE being a second speed. Furthermore, for example, the second speed is slower than the first speed. The second value is greater than the first value. The first generating unit 4a supplies the generated first information to the second generating unit 4b. Alternatively, for example, the first generating unit 4a generates, as the first information, a parameter obtained by assuming that the speed of the mobile station UE falls into each predetermined range (for example, assuming a first range and the parameter in accordance with this range). Furthermore, when the parameter is generated based on an assumption, it is preferable to generate a plurality of parameters (for example, the parameter of the first value corresponding to a speed of the first range and the parameter of the second value corresponding to a speed of the second range). Furthermore, as described above, each of the parameters may also be corresponding to the range of a speed or may also be corresponding to a speed.

The second generating unit 4b generates the broadcast information including the first information such that the mobile station UE performs scaling on the second information related to the measurement cycle of the radio measurement in accordance with the first information when the mobile station UE selects the own cell. Furthermore, when the plurality of parameters are included in the first information, the second generating unit 4b generates the second information for each parameter. The second information includes the first measurement cycle Tm1 in which the mobile station UE measures the reception quality of the own cell and the second measurement cycle Tm2 in which the mobile station UE measures the reception quality of the other cell. The first measurement cycle Tm1 is set to be scaled to a first length when the first information is the parameter of the first value and is set to be scaled to a second length that is longer than the first length when the first information is the parameter of the second value. The second measurement cycle Tm2 is set to be scaled to a third length when the first information is the parameter of the first value and is set to be scaled to a fourth length that is longer than the third length when the first information is the parameter of the second value. The second generating unit 4b supplies the generated broadcast information to the wireless transmitting unit 2.

The wireless transmitting unit 2 cyclically transmits the synchronization signal and the broadcast information to the own cell using beam sweeping.

Figure 5:
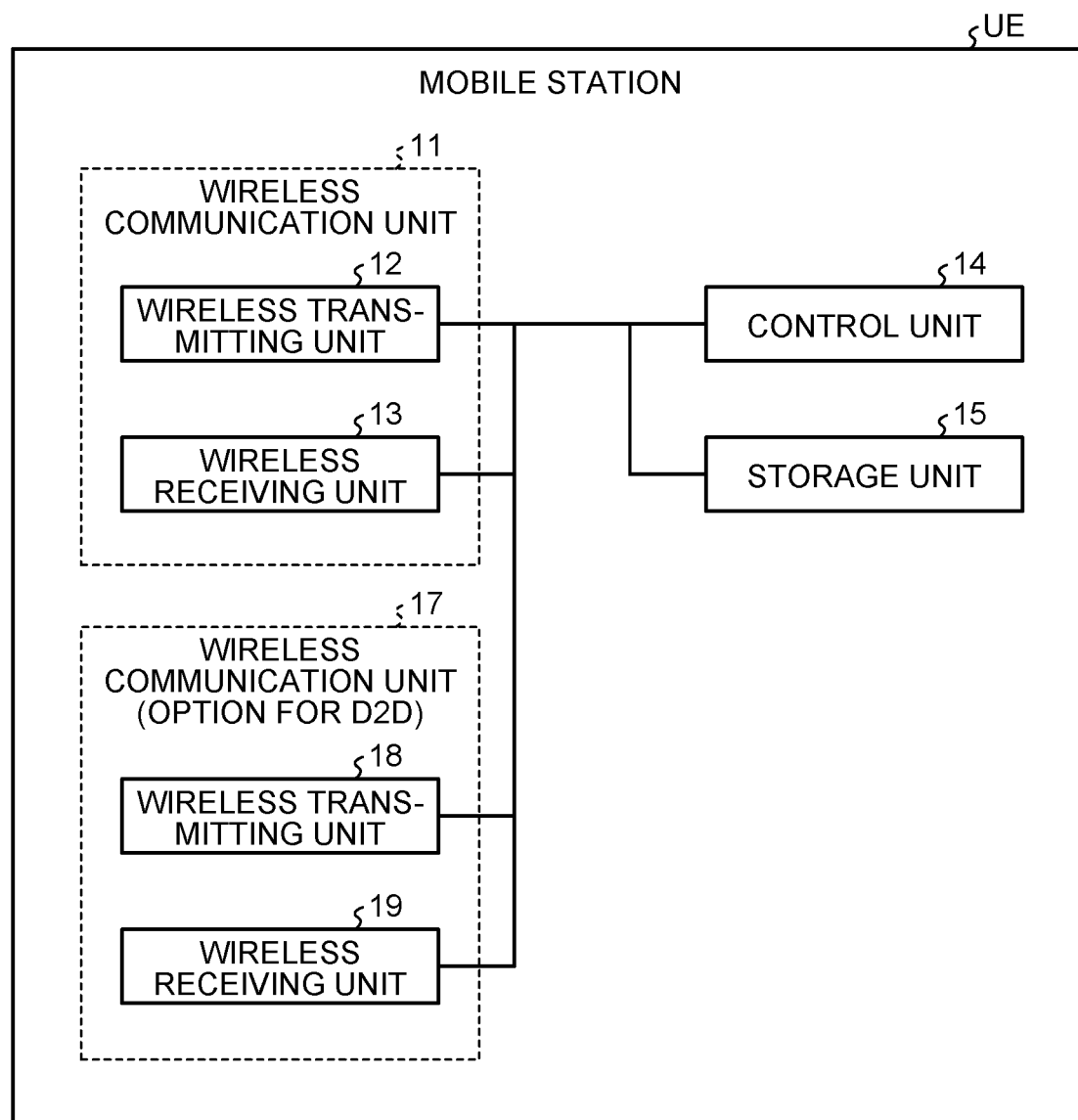
FIG. 5 is a block diagram illustrating a configuration of the mobile station according to the second embodiment.

Furthermore, the mobile station UE can be configured as illustrated in FIG. 5. FIG. 5 is a diagram illustrating a configuration of the mobile station UE. The mobile station UE includes a wireless communication unit 11, a control unit 14, a storage unit 15, and a wireless communication unit 17. The wireless communication unit 11 is a radio interface used for communication with the base station CU and includes a wireless transmitting unit 12 and a wireless receiving unit 13. The wireless communication unit 17 is a radio interface for a side link (D2D link) and includes a wireless transmitting unit 18 and a wireless receiving unit 19.

The control unit 14 can detect a moving speed of the mobile station UE via a predetermined sensor, generate speed information indicating the detected moving speed, and supply the generated speed information to the wireless transmitting unit 12. The wireless transmitting unit 12 transmits the speed information to the base station CU. Furthermore, in some cases, the wireless transmitting unit 12 does not transmit the speed information in accordance with the state of the mobile station UE. For example, when the state of the RRC of the mobile station UE is in a connect mode, the mobile station UE transmits the speed information, however, when the state of the RRC of the mobile station UE is an idle mode and an inactive mode, the wireless transmitting unit 12 does not transmit the speed information because these mode are in a state in which transmission from the mobile station UE is not performed.

The wireless receiving unit 13 receives the broadcast information from the base station. Furthermore, in the broadcast information, a synchronization signal and the first information may also be included. When the mobile station UE selects the own cell, the control unit 14 performs scaling on the second information in accordance with the first information included in the broadcast information and performs radio measurement in the measurement cycle in accordance with the second information that has been scaled.

At this time, when the first information is the parameter of the first value, the control unit 14 performs scaling on the first measurement cycle Tm1 to the first length, and, when the first information is the parameter of the second value, the control unit 14 performs scaling on the first measurement cycle Tm1 to the second length that is longer than the first length. When the first information is the parameter of the first value, the control unit 14 performs scaling on the second measurement cycle Tm2 to the third length, and, when the first information is the parameter of the second value, the control unit 14 performs scaling on the second measurement cycle Tm2 to the fourth length that is longer than the third length. The control unit 14 performs radio measurement in accordance with the first measurement cycle Tm1 that has been scaled and the second measurement cycle Tm2 that has been scaled.

The control unit 14 supplies the results of the radio measurement to the wireless transmitting unit 12. The wireless transmitting unit 12 transmits the results of the radio measurement to the base station CU.

Figure 6:
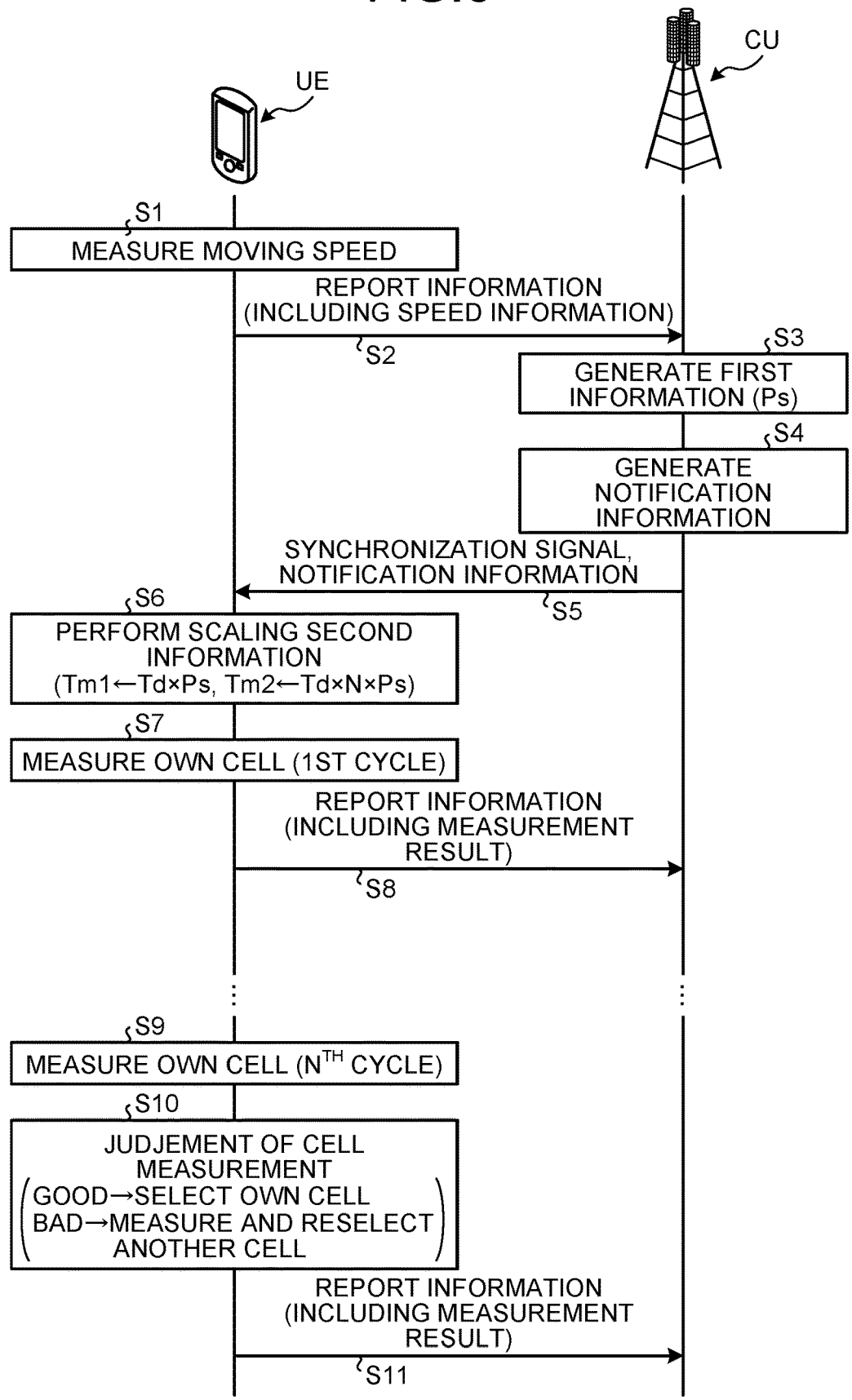
FIG. 6 is a sequence diagram illustrating an operation of a communication system according to the second embodiment.
Figure 7:
FIG. 7 is a diagram illustrating conversion information that is used to generate first information according to the second embodiment.
Figure 8:
FIG. 8 is a diagram illustrating conversion information that is used for scaling performed on second information according to the second embodiment.

In the following, an operation of the communication system CS will be described by using FIG. 6 to FIG. 8. FIG. 6 is a sequence diagram illustrating an operation of the communication system CS according to a first application example of the embodiment. FIG. 7 is a diagram illustrating conversion information that is used to generate the first information in the first application example according to the embodiment. FIG. 8 is a diagram illustrating conversion information that is used to perform scaling of the second information in the first application example according to the embodiment.

The mobile station UE measures a moving speed of the mobile station UE and generates speed information indicating the measured moving speed (Step S1). The mobile station UE generates report information including the speed information and transmits the generated report information to the base station CU (Step S2). When the base station CU receives the report information including the speed information, the base station CU generates the first information (for example, a parameter Ps) in accordance with the moving speed of the mobile station UE indicated by the speed information (Step S3).

Furthermore, the operation of generating the first information is performed such that, when the report information is not transmitted from the mobile station UE, a parameter obtained by assuming that the speed of the mobile station UE falls into each predetermined range (for example, assuming the first range and the parameter in accordance with this range) is generated as the first information.

For example, because the base station CU previously generates conversion information 51 illustrated in FIG. 7 and stores the conversion information 51 in the storage unit 5 (see FIG. 4), the base station CU can refer to the conversion information 51. In the conversion information 51, for example, a moving speed of the mobile station UE is corresponding to the value of the first information (for example, the parameter Ps). In the example illustrated in FIG. 7, when the moving speed is V2 or above (greater than or equal to V2), the value of the first information is set to Ps3; when the moving speed is V1 to V2 (greater than or equal to V1 and less than V2), the value of the first information is set to Ps2 (>Ps3); and, when the moving speed is 0 to V1 (greater than or equal to zero and less than V1), the value of the first information is set to Ps1 (>Ps2).

For example, when the representative value of "V2 or above (greater than or equal to V2)" is 90 km/h, it is possible to set to Ps3=1. When the representative value of "V1 to V2" is km/h, it is possible to set to Ps2=3. When the representative value of "0 to V1" is 3 km/h, it is possible to set to Ps2=8.

The base station CU refers to the conversion information 51 and can determine the value of the first information corresponding to the moving speed of the mobile station UE indicated by the speed information.

Furthermore, when the base station CU does not receive the speed information, the base station CU generates information on an assumed speed range (for example, Ps1, Ps2, and Ps3 illustrated in FIG. 7) as the first information. Furthermore, in this case, a plurality of pieces of information may also be generated.

A description will be given here by referring back to FIG. 6. The base station CU generates the broadcast information including the first information (Step S4). The broadcast information may also be, for example, a master information block (MIB) or may also be a system information block (SIB). The base station CU transmits the synchronization signals and the broadcast information to the own cell by using beam sweeping (Step S5).

When the mobile station UE receives the synchronization signals and the broadcast information from the base station CU, the mobile station UE performs scaling on the second information (for example, the first measurement cycle Tm1 and the second measurement cycle Tm2) in accordance with the first information (for example, the parameter Ps) included in the broadcast information (Step S6).

Furthermore, when a plurality of parameters (for example, Ps1, Ps2, and Ps3) are included in the broadcast information, the mobile station UE selects a parameter in accordance with the current moving speed by using, for example, the control unit 14.

Furthermore, for example, the mobile station UE previously generates conversion information 151 illustrated in FIG. 8 and stores the generated conversion information 151 in the storage unit 15 (see FIG. 5); therefore, the mobile station UE can refer to the conversion information 151. In the conversion information 151, the value of the first information (for example, the parameter Ps) is corresponding to the value of the second information (for example, the first measurement cycle Tm1 and the second measurement cycle Tm2). In the example illustrated in FIG. 8, when the value of the first information is Ps3, the value of the first measurement cycle Tm1 is set to Td×Ps3 (Td: the length of time as a criterion) and the value of the second measurement cycle Tm2 is set to Td×N×Ps3. When the value of the first information is Ps2, the value of the first measurement cycle Tm1 is Td×Ps2 and the value of the second measurement cycle Tm2 is Td×N×Ps2. When the value of the first information is Ps1, the value of the first measurement cycle Tm1 is Td×Ps1 and the value of the second measurement cycle Tm2 is Td×N×Ps1.

For example, when a standard single cycle of the own cell measurement is 320 ms and cell measurement judgement is performed in every four cycles, this can be represented by Td=320 ms and N=4.

The base station CU refers to the conversion information 151 and can determine the value of the second information (for example, the first measurement cycle Tm1 and the second measurement cycle Tm2) corresponding to the value of the first information included in the broadcast information.

A description will be given here by referring back to FIG. 6. The mobile station UE performs radio measurement of the own cell in the measurement period MP in the first cycle (Step S7). When the measurement period MP ends, the mobile station UE generates report information including the result of the radio measurement and transmits the generated report information to the base station CU (Step S8).

Furthermore, when the state of the RRC of the mobile station UE is an idle state or an inactive state or when the mobile station UE moves in a low power consumption mode, the mobile station UE does not need to transmit the report information including the result of the radio measurement. In short, the mobile station UE does not need to transmit the report information including the result of the radio measurement illustrated in FIG. 6 (Step S8).

After this, the mobile station UE repeatedly performs the processes at Steps S7 and S8 at intervals of the first measurement cycle Tm1.

When the mobile station UE performs radio measurement on the own cell in the measurement period MP in the $N^{th}$ cycle (Step S9), the mobile station UE performs cell measurement judgement in response to reaching the second measurement cycle Tm2 (Step S10). In the cell measurement judgement, the mobile station UE judges whether the reception quality of the own cell meets a criterion (for example, the reception strength of the reference signal is greater than or equal to the threshold). When the criterion is met, the mobile station UE selects the own cell, and, when the criterion is not met, the mobile station UE performs radio measurement that measures the reception quality of the base station CU in the other cell. The mobile station UE judges whether the reception quality of the other cell meets the criterion, and, when the criterion is met, the mobile station UE reselects the other cell.

The mobile station UE generates the report information including the result of the radio measurement (i.e., the result of the measurement of the own cell and the result of the cell measurement judgement) and transmits the generated report information to the base station CU (Step S11).

Consequently, as illustrated in FIG. 9, it is possible to lengthen the cell selection time of the mobile station UE that is moving at low and medium speeds and it is possible to improve the capture rate of the own cell. FIG. 9 is a diagram illustrating an improvement of the capture rate of the own cell in the first application example according to the embodiment. For example, as indicated by (a) illustrated in FIG. 9, when an obstacle OBS is present in an area corresponding to a beam BM-2, the mobile station UE detects, in a predetermined measurement period MP, a synchronization signal in a synchronization transmission block SSB-1 associated with the beam BM-1 for the mobile station UE. Then, as indicated by (b) illustrated in FIG. 9, at a point in time at which the mobile station UE moves to the area corresponding to the beam BM-2, the mobile station UE does not reach the next measurement period MP of the predetermined measurement period MP. Accordingly, in the mobile station UE, radio measurement is not performed. Thereafter, as indicated by (c) illustrated in FIG. 9, the mobile station UE reaches the next measurement period MP at a point in time at which the mobile station UE moves to the area corresponding to a beam BM-3, and then, detects the synchronization signal in a synchronization transmission block SSB-3 associated with the beam BM-3.

Namely, the base station CU can control the measurement cycle of the radio measurement of the mobile station UE such that the mobile station UE detects the synchronization signal in the synchronization transmission block SSB-1 associated with the beam BM-1 and in the synchronization transmission block SSB-3 associated with the beam BM-3. Consequently, the mobile station UE can reduce the electrical power consumption due to an operation (measurement of the other cell) involved with a failure of the own cell selection. Furthermore, the mobile station UE can also efficiently perform the cell selection.

Furthermore, it is possible to suggest the content described in the second embodiment to the technical standards, it is possible to realize implementation, and, for example, it is also possible to include the first information into descriptions of the MIB, the SIB, and the like described in, for example, TS36.331, TS38.331, and the like.

Third Embodiment

In the second embodiment, an example of efficiently performing the cell selection by controlling the measurement cycle of the radio measurement in the terminal has been described. In the third embodiment, a method for controlling the other cell measurement of the mobile station UE performed by the base station CU will be described. Furthermore, the same reference numerals are assigned to the components having the same configuration as those according to the other embodiments.

In a case in which the wireless receiving unit 13 in the base station CU receives the measurement result of the reception quality of the own cell from the mobile station UE, the wireless receiving unit 13 supplies the measurement result of the reception quality of the own cell to the second generating unit 4b. The second generating unit 4b generates a measurement instruction that allows for the mobile station UE to measure the other cell without waiting for the second measurement cycle Tm2 that has been scaled when the reception quality of the own cell does not meet the criterion in accordance with the measurement result of the reception quality of the own cell. Furthermore, the mobile station UE measures the other cell when the mobile station UE detects the state in which, for example, the speed of the mobile station UE is less than a predetermined value (for example, a not moving state). The second generating unit 4b supplies the measurement instruction to the wireless transmitting unit 2. The wireless transmitting unit 2 transmits the measurement instruction to the mobile station UE.

When the wireless receiving unit 13 in the mobile station UE receives the measurement instruction from the base station CU, the wireless receiving unit 13 supplies the measurement instruction to the control unit 14. The control unit 14 can measure the other cell without waiting for the second measurement cycle Tm2 in accordance with the measurement instruction.

Furthermore, in a case in which, for example, the moving speed of the mobile station UE is greater than or equal to the predetermined value, the mobile station UE does not always need to measure the other cell even when the mobile station UE receives the measurement instruction. The reason is that, because the moving speed is fast when a moving speed is greater than or equal to a predetermined speed, even if the mobile station UE temporarily stays in, for example, a blind zone of the radio waves (for example, a blind zone caused by radio wave interception, diffraction, or the like due to buildings or the like), the mobile station UE is highly likely to exit from the blind zone.

Figure 10:
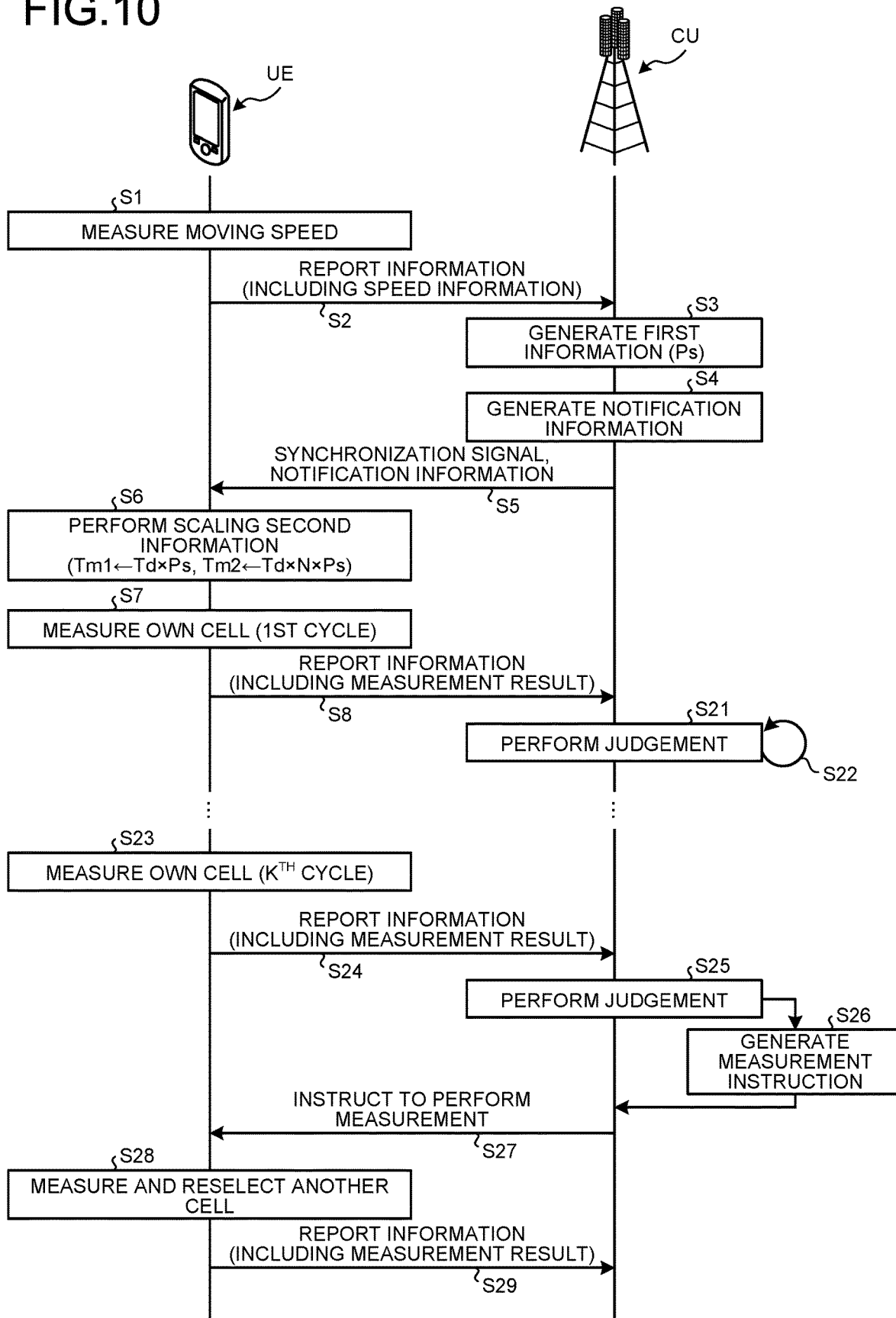
FIG. 10 is a sequence diagram illustrating an operation of a communication system according to a third embodiment.

Furthermore, in the third embodiment, an operation of the communication system CS is like that illustrated in FIG. 10. Furthermore, some of the operation can be omitted (a process is not performed), as described in FIG. 6.

After the processes at Steps S1 to S8 have been performed in a similar manner as that performed in the first application example, the base station CU judges whether the reception quality of the own cell meets the criterion (for example, a state in which the reception strength exceeds the threshold) in accordance with the measurement result of the reception quality of the own cell included in the report information (Step S21), and waits if the criterion is met (Step S22).

Thereafter, the processes at Steps S7 and S8 performed by the mobile station UE and the process at Step S21 performed by the base station CU are repeated in each of the first measurement cycles Tm1.

The mobile station UE performs the radio measurement of the own cell in the measurement period MP in a K$^{th}$ cycle (K<N, K is an integer) (Step S23). When the measurement period MP ends, the mobile station UE generates report information including the radio measurement and transmits the generated report information to the base station CU (Step S24).

The base station CU judges whether the reception quality of the own cell meets the criterion (for example, a state in which the reception strength exceeds the threshold) in accordance with the measurement result of the reception quality of the own cell included in the report information (Step S25), and, when the criterion is not met, the base station CU generates a measurement instruction (Step S26). The measurement instruction contains the content indicating to the mobile station UE to perform the measurement of the other cell without waiting for the second measurement cycle Tm2 that has been scaled. The base station CU transmits the measurement instruction to the mobile station UE (Step S27).

When the mobile station UE receives the measurement instruction from the base station CU, the mobile station UE performs measurement of the other cell without waiting for the second measurement cycle Tm2 in accordance with the measurement instruction (Step S28). The mobile station UE generates report information including the result of the radio measurement (i.e., the result of the measurement of the other cell) and transmits the generated report information to the base station CU (Step S29).

Furthermore, regarding the processes performed at Steps S21 to S25, the description has been given with the assumption that the measurement information is received from the mobile station UE; however, there may be a case in which the mobile station UE does not transmit the report information when the state of the RRC is an idle state or an inactive state, or when the mobile station UE moves in a low power consumption mode. For example, when the mobile station UE transmits the measurement information in a case in which the state of the RRC is an idle state or an inactive state, there is a need to transit the state of the RRC of the mobile station UE to a connect mode, which result in an increase in power consumption. Therefore, it is preferable not to transmit the measurement information (not to transit to the connect mode) from the viewpoint of electrical power saving.

In this case, the measurement instruction is transmitted by using, for example, a synchronization signal or the broadcast information that is cyclically transmitted. In short, transmission is performed by including the information that is to be transmitted at processing Step S27 into the information that is to be transmitted at processing Step S5. Furthermore, it may also be possible to previously include the information on the measurement instruction that is to be sent from the base station CU to the mobile station UE into an RRC message as configuration information of the RRC and then transmit the information.

In a case in which the mobile station UE receives the measurement instruction, the mobile station UE can perform the measurement of the other cell when the mobile station UE is in a predetermined condition (Step S28). Furthermore, the predetermined condition is, for example, the moving speed, the status of the radio quality of the mobile station UE (for example, in a case in which communication quality is less than a predetermined value N time in a row), or the like.

Accordingly, when the reception quality of the own cell does not meet the criterion, because it is possible to promptly induce the mobile station UE to the other cell without being restricted by the second measurement cycle Tm2, it is possible to suppress degradation of the communication quality due to delay of measurement implementation of the other cell.

Furthermore, it is also possible to include the measurement instruction described in the third embodiment into descriptions of the RRC message, the MIB, the SIB, and the like described in, for example, TS36.331, TS38.331, and the like.

As described above, in the third embodiment, in the base station CU, by transmitting information including the first information that can control the condition of the radio measurement to the base station CU, control is performed such that the radio measurement is performed in the mobile station UE under the condition in accordance with the second information that is controlled by the first information. Consequently, the base station CU can perform control of the condition of the radio measurement in the mobile station UE such that the cell selection/reselection is appropriately performed under this condition. It is possible to optimize cell selection/reselection performed by the mobile station UE.

Fourth Embodiment

Furthermore, regarding the first to the third embodiments, each of the embodiments can be used in any appropriate combinations as long as they do not conflict with each other. For example, in the second embodiment and in the third embodiment, by using both of the relationship between the first information and the moving speed prescribed in the second embodiment and the measurement instruction prescribed in the third embodiment, it is possible to advance the measurement of the other cell or delay the measurement of the other cell in accordance with the status of the mobile station UE.

Each of the components in the units illustrated in the drawings is not always physically configured as illustrated in the drawings. In other words, the specific shape of a separate or integrated unit is not limited to the drawings; however, all or part of the unit can be configured by functionally or physically separating or integrating any of the units depending on various kinds of loads or use conditions.

Furthermore, all or any part of various processing functions performed by each unit may also be executed by a central processing unit (CPU) (or a microcomputer, such as a micro processing unit (MPU), a micro controller unit (MCU), or the like). Furthermore, all or any part of various processing functions may also be executed by programs analyzed and executed by the CPU (or the microcomputer, such as the MPU or the MCU), or executed by hardware by wired logic.

A wireless device according to the embodiments (i.e., an aggregation node CU-CP, an aggregation node CU-UP, a distributed node DU, the terminal UE) can be implemented by, for example, the following hardware structure.

Figure 11:
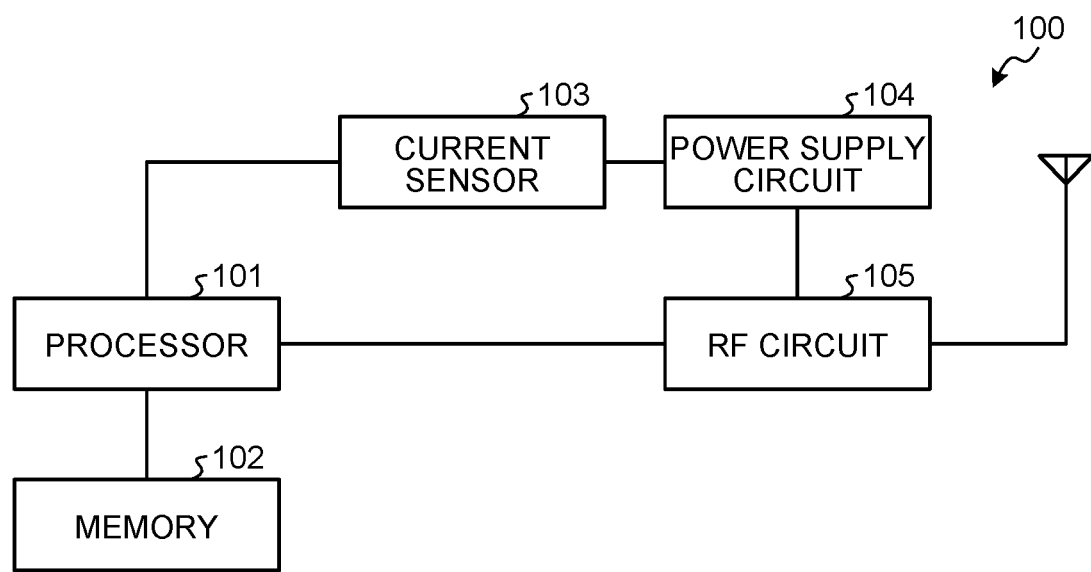
FIG. 11 is a diagram illustrating an example of a hardware configuration of a wireless device that is used in each of the embodiments.

FIG. 11 is an example of a hardware structure of the wireless device. As illustrated in FIG. 11, a wireless device 100 includes a processor 101, a memory 102, a current sensor 103, a power supply circuit 104, and an RF circuit 105. An example of the processor 101 includes a CPU, a digital signal processor (DSP), a field programmable gate array (FPGA), or the like. Furthermore, an example of the memory 102 includes a random access memory (RAM), such as a synchronous dynamic random access memory (SDRAM), a read only memory (ROM), a flash memory, or the like.

Then, various processing functions performed by the wireless device according to the embodiment may also be implemented by executing programs stored in various memories, such as a nonvolatile storage medium, by a processor. Namely, the programs corresponding to each process may also be stored in the memory 102 and each of the programs may also be executed by the processor 101. Furthermore, the communication I/F can be implemented by the RF circuit 105.

According to an aspect of the wireless device disclosed in the present invention, it is possible to optimize cell selection/reselection.

All examples and conditional language provided herein are intended for the pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A base station that can transmit a synchronization signal at a predetermined transmission interval in a plurality of cycles and can form a first cell, the base station comprising:
   a transmitter configured to transmit, in the first cell, the synchronization signal in a plurality of radio signals; and
   a controller configured to:
   cause to a mobile station connected the based station to detect the synchronization signal under a condition that is according to second information related to a of the mobile station, the second information being controlled first information, and
   cause to the mobile station to perform a cell selection or a cell re-selection according to a criterion of a reception quality for the first cell, wherein
   a measurement cycle of a radio measurement of the mobile station is a cycle obtained by multiplying a measurement cycle as a criterion by N (N is an integer multiple).

2. The base station according to claim 1, wherein
the controller is further configured to cause to the mobile station to perform the cell selection or the cell re-selection by controlling the transmitter to transmit measurement instruction information that enables a measurement of a second cell.

3. The base station according to claim 1, wherein
the cell selection or the cell re-selection includes a process that enables the mobile station to measure a signal of a second cell different from the first cell.

4. The base station according to claim 3, wherein
the cell selection or the cell re-selection includes the process that enables the mobile station to radio measure the signal of the second cell at a timing other than a timing of radio measurement of the signal of the second cell, a timing of radio measurement being according to the measurement cycle.

5. The base station according to claim 3, wherein
the transmitter is further configured to cyclically transmit, in the first cell, the synchronization signal and broadcast information by using beam sweeping or beam spanning.

6. The base station according to claim 1, wherein
the controller is further configured to:
   generate the first information; and
   generate notification information including the first information such that, when the mobile station selects an own cell, the mobile station performs scaling on the second information related to a measurement cycle of the radio measurement in accordance with the first information.

7. A mobile station that can receive a synchronization signal transmitted from a base station that can transmit the synchronization signal at a predetermined transmission interval in a plurality of cycles and can form a first cell, the mobile station comprising:
   a receiver configured to receive the synchronization signal; and
   a processor configured to:
   control to detect the synchronization signal under a condition in accordance with second information, the second information that is being controlled by using first information, and perform a cell selection or cell re-selection according to a criterion of a reception quality for the first cell, wherein a measurement cycle of a radio measurement of the mobile station is a cycle obtained by multiplying a measurement cycle as a criterion by N (N is an integer multiple).

8. The base station according to claim 7, wherein the receiver is further configured to receive measurement instruction information that enables a measurement of a second cell, and the controller is further configured to perform the cell selection or the cell re-selection according to the criterion and measurement instruction information.

9. The base station according to claim 7, wherein the controller is further configured to measure a signal of a second cell different from the first cell for the cell selection or the cell re-selection.

10. The base station according to claim 9, wherein the controller is further configured to measure the signal of the second cell at a timing other than a timing of radio measurement of the signal of the second cell, a timing of radio measurement being according to the measurement cycle.

11. A communication system comprising:

a base station configured to transmit a synchronization signal at a predetermined transmission interval in a plurality of cycles and to form a first cell, and a mobile station that is connected to the base station, wherein the base station configured to:

transmit, in the first cell, the synchronization signal in a plurality of radio signals, cause to a mobile station connected the based station to detect the synchronization signal under a condition that is according to second information related to a of the mobile station, the second information being controlled first information, and cause to the mobile station to perform a cell selection or a cell re-selection according to a criterion of a reception quality for the first cell, wherein a measurement cycle of a radio measurement of the mobile station is a cycle obtained by multiplying a measurement cycle as a criterion by N (N is an integer multiple).

* * * * *